March 14, 1944.     E. D. COLEMAN     2,343,885
TEST METHOD AND APPARATUS THEREFOR
Filed April 21, 1941     3 Sheets-Sheet 1
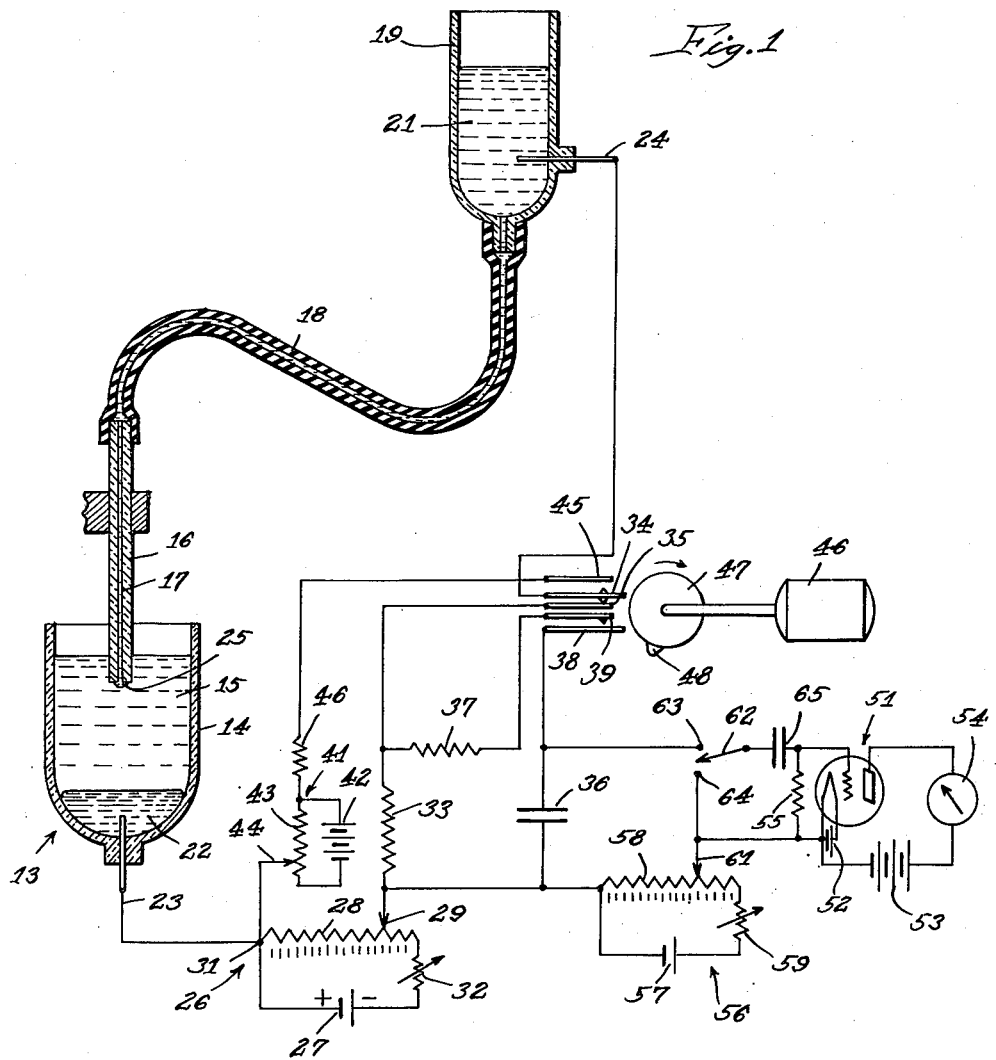

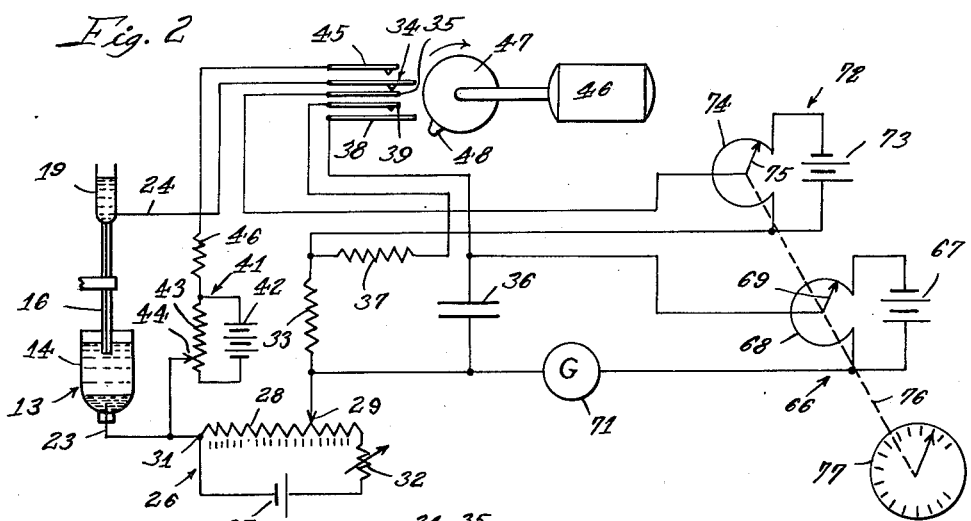
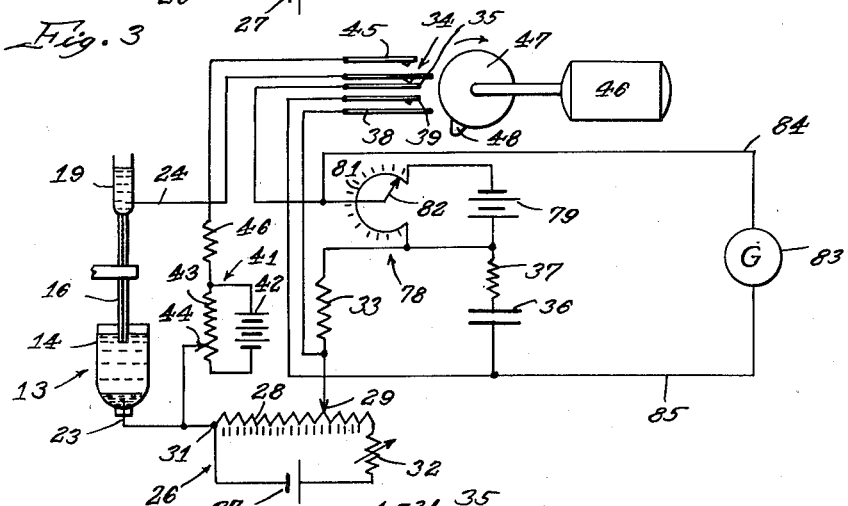
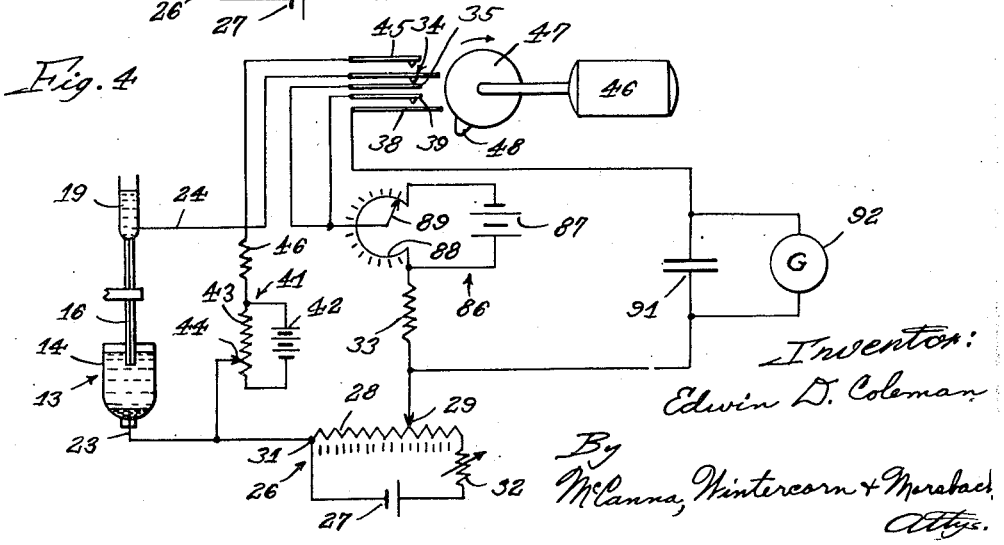

Inventor:
Edwin D. Coleman
By
McCanna, Winterearn & Morsbach
Attys.

Patented Mar. 14, 1944

2,343,885

UNITED STATES PATENT OFFICE 2,343,885

TEST METHOD AND APPARATUS THEREFOR

Edwin D. Coleman, Maywood, Ill.

Application April 21, 1941, Serial No. 389,559

23 Claims. (Cl. 175—183)

This invention relates to improvements in the method and apparatus for making chemical analyses of the general class known variously as "polarographic," "voltimetric" and "amperometric" methods. The invention is herein described with special application to the dropping mercury electrode, but it will be seen that certain phases of the invention are not limited to this particular electrode and are of merit in combination with any suitable electrode such, for example, as the electrodes and cells shown and described in a copending application of Oscar Kanner and Edwin D. Coleman, Serial No. 373,326, filed January 6, 1941. Other phases of the invention contemplate improvements in a dropping mercury electrode per se.

One of the difficulties with instruments of this type employing the dropping mercury electrode is the fact that while the flow of current through the cell depends upon the concentration of the substance being deposited, it also depends upon the rate at which the mercury flows through the capillary and upon the area of mercury exposed to the solution in the cell; in other words, the flow of current varies with the size of the mercury drop. The flow of current therefore changes constantly during the life of each mercury drop. This means that during the formation of the drop, the current increases to a maximum and then sharply falls off to a minimum as the forming drop completes its formation and is severed from the column of mercury forming its source. As a result, the galvanometer employed in a measuring circuit must continuously oscillate in following the alteration as successive drops form and fall. When the data are recorded with a device such as the "polarograph" this variation of current with the drop life appears as marked waves in the current-voltage curve which result in considerably less accuracy than might otherwise be obtained.

An object of the invention is the provision of an improved apparatus of the character described whereby difficulties heretofore associated with the change in current during the drop life are largely eliminated.

A further object of the invention is the provision of a novel method of making measurements of the type described, wherein the flow of current is determined at a preselected phase in the drop life and the drop is thereafter rejected from the electrode mechanism to initiate the development of a successive drop and to produce a zero reference point for measurement of the drop life.

Another object of the invention is the provision in a device of the character described of means for compensating for changes in the apparent potential applied to the cell during the course of the cycle of measurements.

A still further object of the invention is the provision of means for compensating in the cell circuit for the value of the voltage lost in measuring elements of the circuit to thereby cause the instrument to read directly without the necessity for conversion of the results.

Another important object of the invention is the provision in a device of the character described of electrical means for successively discarding the mercury drops promptly after they have served their purpose to successively initiate the formation of new drops.

Figure 1 is a diagrammatic view showing an embodiment of the invention with particular application to a dropping mercury electrode, wherein means are provided for testing the current through the cell at a particular point in the life of the mercury drops;

Fig. 2 shows a further embodiment of the invention having potentiometric compensating means;

Figs. 3 and 4 are further embodiments of the device showing further means for producing a compensated response;

Figure 5:
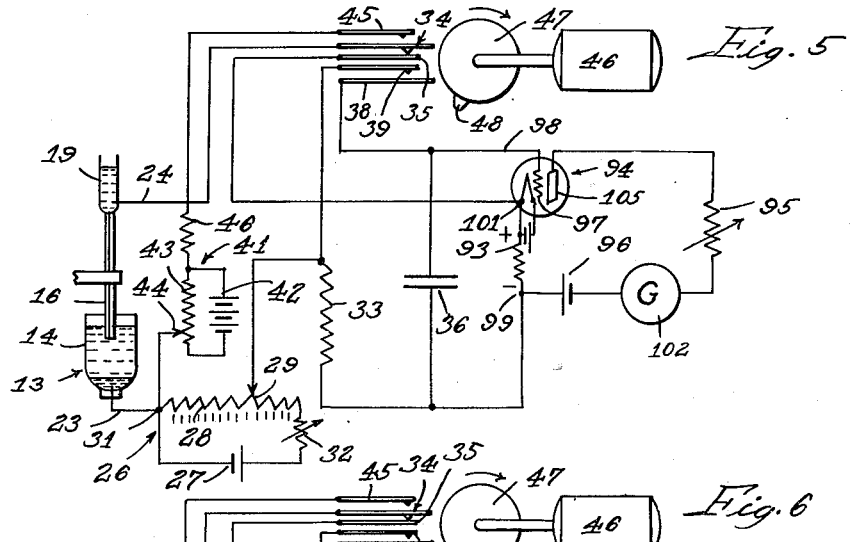
Figs. 5 and 6 are still further embodiments of the invention showing electronic means for accomplishing compensation.

The device shown in Figure 1 includes a cell indicated generally by the numeral 13, this being the conventional dropping mercury electrode cell and including a vessel 14 in which the sample under test is positioned as indicated at 15. Suspended above the sample 15 with its lower end submerged is a capillary tube 16 forming the electrode carrier and having a capillary 17. In this instance a rubber tube 18 connects the opposite end of the capillary tube to a reservoir 19 containing a supply of mercury as indicated at 21. In this particular embodiment there is shown for purpose of illustration a mercury pool 22 positioned in the bottom of the vessel 14 and serving as the reference electrode of the cell, though in special instances other types of reference electrodes will be used, as is well known in the art. The mercury pool is generally covered with calomel to assist depolarization and a low concentration of a soluble chloride such as potassium chloride or lithium chloride may be dissolved in the liquid under test.

Means are provided such as a conductor 23 for making electrical contact with the mercury pool 22, and likewise a conductor 24 serves to make electrical contact with the mercury in the reservoir 19. The reservoir 19 is commonly disposed at an elevation above the capillary tube so that the mercury will flow through the tube and spontaneously form at the end thereof in the form of small drops as indicated at 25. Conveniently the capillary is of such size that the drops will normally spontaneously form and fall at the rate of about one drop each three seconds. It will be understood that the actual diameter and length of this capillary may vary, depending upon the elevation of the reservoir and other factors. Where special means are provided for disposing of the drop, this aforementioned dropping rate may be varied through a wide range, as will presently be described.

A cell circuit is provided for impressing on the cell any of a plurality of potentials, in accordance with the usual practice, and this circuit includes a potentiometer designated generally by the numeral 26, which potentiometer includes a battery 27 connected in series with a reasonably low resistance 28, for example, up to about three hundred ohms, which is provided with a slider 29 by means of which suitable voltages may be produced between the slider 29 and a point 31 at one end of the resistance 28. This is the usual calibrated potentiometric circuit, and includes a variable resistance 32, the battery 27 suitably being of about four volts. The conductor 23 from the reference electrode is connected to the potentiometer at the point 31, and the conductor 24 from the mercury reservoir is connected to the slider 29 through a resistance 33, suitably between about two thousand and one hundred thousand ohms depending upon the composition of the test sample and through a normally closed switch including in this instance switch levers 34 and 35, thus completing the cell circuit. In this manner the potentiometer 26 functions to impress a desired potential on the cell, and the current flowing through the cell is measured by measuring the IR drop across the resistance 33, as will presently appear.

A condenser 36 and a resistance 37 are connected in parallel with the resistance 33 of the cell circuit through a switch including switch blades 38 and 39, the switch being normally open and being momentarily closed to charge the condenser 36 in accordance with the potential across the resistance 33 so that the charge on the condenser 36 may be measured to measure the potential on the resistance 33 and thus indirectly measure the current through the cell 13.

In instruments of this nature known in the prior art, the current through the cell is measured continuously and throughout the entire life of the drop 25, that is, during the entire period of its formation, the average current being taken as indicative. In the above-mentioned application, there is disclosed a method and apparatus for measuring the current at a particular point or phase in the drop cycle, that is, during a definite time increment beginning at a definite time interval after the drop has commenced to form. The apparatus therein disclosed also functions to greatly increase the speed of drop formation without introducing the difficulty heretofore encountered when the dropping rate was increased beyond a certain point, usually about thirty drops per minute. I have herein shown an improved method for increasing the dropping rate which is not dependent upon mechanical manipulation of the capillary tube and which likewise functions to dispose of the mercury drop at the end of the capillary tube and to effect a sampling of the current through the cell at a pre-selected time after disposing of the drop so as to make the measurement at a uniform point or phase after the start of the formation of a new drop. This measurement is accomplished by momentarily closing the switch comprising the blades 38 and 39 to charge the condenser 36 in response to the potential across the resistance 33 at the selected phase in the drop life which is, of course, proportional to the current through the cell during such phase. According to my invention, the dropping rate is increased by providing a potentiometer designated generally by the numeral 41 including a battery 42, a resistance 43 and a slider 44, the slider being connected to the point 31, and the end of the resistance 43 being connected to the conductor 24 leading to the mercury pool through a normally open switch including switch blades 45 and 34 and through a limiting resistance 46. It will be seen that closing of the switch by movement of the switch blade 34 into contact with the switch blade 45 closes the circuit through the cell by way of the potentiometer 41 and applies to the drop 25 a high cathode potential. This high potential, which may vary between five and one hundred volts, so reduces the surface tension of the mercury drop that it is released from the capillary tube and a new drop begins to form. It will be seen that the cell circuit is open during the closing of the high potential circuit.

The switches formed by the blades 34, 35, 38, 39 and 45 are actuated by means of a motor designated generally by the numeral 46 or other motive power of substantially constant speed which drives a cam 47 having a cam face 48. In this instance the cam is rotated in a clockwise direction and is shown as approaching a position in which the switch blade 38 will be moved into contact with the blade 39, thus momentarily closing the condenser circuit. As the cam face 48 moves beyond the end of the blade 38, the blade snaps back to its previous position, opening the contact between 38 and 39. Promptly thereafter the cam face 48 engages the switch blade 34, moving the same away from the switch blade 35 to open the cell circuit and thereafter bringing the switch blade 34 into contact with the blade 45 to close the high potential circuit and cause the release of the drop 25 and consequently the initiation of a new drop as soon as the cam face 48 releases the blade 34 allowing the opening of the high potential circuit and the closing of the cell circuit. The drop is allowed to form while the face 48 rotates through a major portion of a revolution, the current to the drop being again sampled when the switch blade 38 is moved into contact with the blade 39, the cycle repeating itself at a speed dependent upon the speed of rotation of the cam. I have found that this speed can be increased to a point well beyond the speed of psychological reaction of the operator so that after a setting of the testing portion of the device presently to be described, a new charge will be brought onto the condenser 36 prior to the time the operator can determine what change should be made in the instrument so that there is therefore no delay occasioned by the periodic nature of the current sampling means. If the spontaneous dropping rate of the mercury is not too much slower than the desired synchronous rate, synchronism can be established in this manner by applying a fairly high cathode potential to the drop. With this potential applied, the surface tension of the drop is decreased and if the drop is sufficiently large prior to the application of this potential, its immediate release will be effected.

Referring again to the holding circuit including the resistance 37 and condenser 36, the value of the resistance 37 should be such as to smooth out minor errors due to imperfect contact action or imperfect timing. Under the conditions prevailing in this particular structure, the resistance 37 may suitably be of about 1 megohm and the capacity of the condenser about 2 microfarads, though it will be understood that these values may be varied rather widely, dependent upon the preformance characteristics desired.

The charge on the condenser 36 is in this structure measured by a potentiometric measuring device, in this instance including a vacuum tube voltmeter suitably including a type 30 vacuum tube, indicated generally by the numeral 51, a cathode exciting battery 52 of two volts, a plate battery 53 of about twenty-two and one-half volts, a plate meter 54 of about 0–5 m. a. sensitivity and a grid leak 55 of about fifty megohms resistance. A calibrated potentiometer indicated generally by the numeral 56 and including a battery 57 suitably of three volts, a variable resistance 59 suitably of 250 ohms, a uniform resistance 58 suitably of 250 ohms and a sliding contact 61 is connected to one side of the condenser 36. By adjustment of the slider the potentiometer can be caused to develop a potential equal and opposite to that produced in the condenser 36 by the current flowing through the test cell, and this condition of balance is determined by moving a switch element 62 between closing positions with respect to contacts 63 and 64. When the balance is perfected, moving the switch between these two contacts produces no change in the charge on a condenser 65, and consequently no change in potential of the grid of the vacuum tube 51, and no response in the meter. Thus the current flow through the resistance 33 is measured by adjusting the slider 61 until the meter 54 shows no appreciable movement when the switch element 39 is moved between contacts 63 and 64.

In the structure heretofore described it will be noted that the potential applied to the cell is determined by the setting of the slider 29 on the calibrated resistance 28 of potentiometer 26. However, there occurs an IR drop in the resistance 33, and the result of this drop is that the potential actually applied to the cell is less than that indicated by the potentiometer. Therefore, in order to accurately graph the data, it is necessary to subtract from the potential indicated by the potentiometer, the value of the voltage lost in resistance 33. This, of course, is objectionable in such an instrument as being a time-consuming operation, but what is more important, there are instances, where the IR value of resistance 33 is very large, where a condition can be reached in which increasing the voltage from the potentiometer 26 has little effect on the cell potential because the drop occurs mostly in the resistance 33. In Figs. 2, 3 and 4 there are shown embodiments of the invention wherein the potential indicated by the potentiometer 26 is actually applied to the cell and not absorbed in the resistance 33 so that the calibration scale of the potentiometer indicates the true potential applied to the cell.

Directing attention first to Fig. 2, the embodiment therein shown includes the cell structure of Fig. 1 as well as the cell circuit, the high potential circuit, the condenser circuit and the motor 46 and cam 47 heretofore described. A measuring potentiometer indicated generally by the numeral 66 is provided having a battery or other source of power 67 and a resistance 68 and slider 69, the slider being connected to one side of the condenser 36. The other side of the resistance 68 is connected to the opposite side of the condenser 36 through a galvanometer 71, this galvanometer being an electron galvanometer, quadrant galvanometer or some other analogous device, the energy consumption of which is of a very low order of magnitude. This is necessary because of the low energy level which can be properly stored in the condenser 36. A second potentiometer indicated generally by the numeral 72 and likewise including a source of power 73, resistance 74 and slider 75 is interposed in the cell circuit in series with the resistance 33, in this instance in the conductor 24 between the mercury reservoir and the resistance 33. The potentiometers 66 and 72 are both operated from a single shaft as shown at 76, operated conveniently from a knob on a calibrated dial 77 which serves to simultaneously adjust both of the potentiometers. Thus, when the knob is turned to effect a balance at the galvanometer 71, not only does the potentiometer 66 oppose a selected potential to the potential on the condenser 36, but potentiometer 72 is arranged to apply an exactly equal potential increment to the cell circuit, since it is identical with potentiometer 66 and is in series with the cell and with the resistance 33. When the potential drop over the resistance 33 at the selected instant is exactly opposed by the potentiometer 66, as indicated by zero deflection of the galvanometer 71, the potentiometer 72 is applying to the cell circuit an additional potential equal to that lost in the resistance 33, the net result being that the potential applied to the cell is that indicated by the potentiometer 26 at the time of balance and at the selected phase of the cycle. It will be understood that the potentiometers 66 and 72 must be carefully adjusted to give equivalent potentials.

In Fig. 3 I have shown a further embodiment of the invention having means for feeding into the cell circuit a compensating potential which has the advantage over the form shown in Fig. 2 of being substantially more simple in construction and not requiring the delicate balancing of parts. This form of the invention employs the same cell structure as that shown in Fig. 1, and likewise has the high potential circuit for causing the release of the mercury drops, the cell circuit including the potentiometer 26, the resistance 33, the motor 46, cam 47 and associated switches operated in a like manner. In this instance a potentiometer 78 is provided for introducing the required voltage into the cell circuit, the potentiometer having a battery 79 for feeding a resistance 81 having a slider 82 connected to the conductor 24, the potentiometer 78 thus being in series with the resistance 33. A galvanometer 83 similar to the galvanometer 71 is connected by a conductor 84 to the conductor 24 between the cell and the potentiometer, the opposite side thereof being connected to the switch blade 39 and to the condenser 36 by a conductor 85. It will be seen that in effect the functions of the potentiometers 66 and 72 of Fig. 2 are combined in the potentiometer 78 of Fig. 3. The switch is closed momentarily at the selected instant in the drop life by operation of the cam 47, and thereupon condenser 36 is charged to a value indicative of the cell output as heretofore described. The potentiometer 78 is then adjusted to balance this potential on the condenser as indicated by the galvanometer 83, at which point its own reading is a measure of the current through the cell while it also automatically impresses this same required compensating potential to the cell circuit and thus causes potentiometer 26 to read the value of applied potential correctly.

In the form of the invention shown in Fig. 4, which shows the preferred embodiment of the means for introducing a compensating potential into the cell circuit, there is shown a structure which avoids the disadvantages of the previously discussed forms. In Fig. 3, for example, the structure has the disadvantage that any leakage or loss of charge from the condenser 36 causes an error in the reading of the potentiometer 78, and therefore, under certain circumstances this construction may be found to be inadvisable. In the embodiment of Fig. 4 there is again shown the cell of Fig. 1 as well as the high potential circuit for releasing the mercury drops, the cell circuit including the potentiometer 26, resistance 33, the motor 46, cam 47 and associated switches heretofore described. Interposed in series in the cell circuit between the resistance 33 and the cathode is a potentiometer indicated generally by the numeral 86 having a source of power 87 such as a battery and a calibrated resistance 88, one end of the resistance being connected to the resistance 33, the slider 89 of the potentiometer being connected to the conductor 24. In this instance a condenser 91 is positioned in parallel with the resistance 33 and the potentiometer 86, and has one side connected between the potentiometer 26 and the resistance 33, and the other side thereof connected to the conductor 24 through switch blades 38 and 39, the switch blade 38 being operated by the cam 47 in timed relation with the switch blade 34 in the manner heretofore described in order to synchronize the device. A galvanometer 92 similar to the galvanometers 83 and 71 is connected to opposite sides of the condenser 91. It will be seen that in this instance the potentiometer 86 is balanced directly against the resistance 33. Then at the selected instant in the drop life, the cam 47 operates to close the switch blade 38 to impress on the condenser 91 any difference in potential which will result if the balance is imperfect, which will be reflected on the galvanometer 92. The condenser 91 is thus used in a null capacity only instead of being used as a quantitative holding device as in the previous forms. Hence any leakage influences only the sensitivity of the potentiometer setting and cannot become the basis of false readings. The galvanometer 92, as well as the galvanometers 71 and 83 of Figs. 2 and 3 must, of course, be such as to draw so little current that no appreciable discharge of the condenser occurs.

Figure 6:
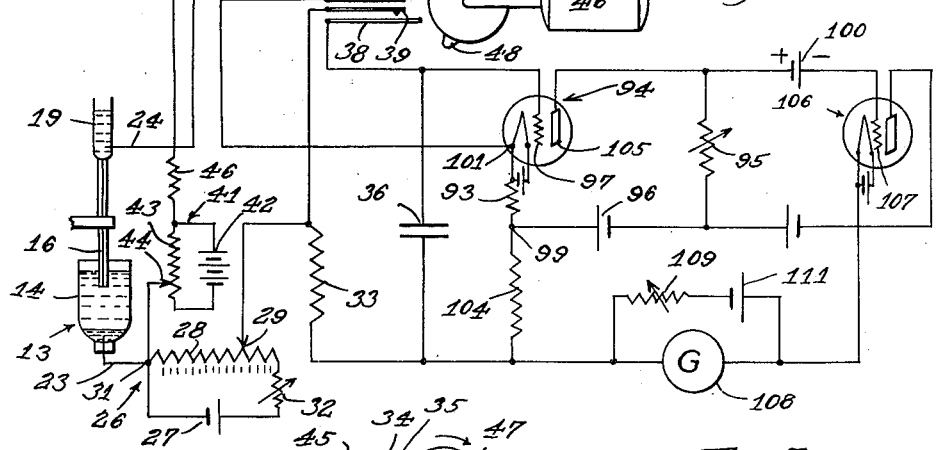

Under many circumstances it is desirable to have an instrument which has direct reading with respect to the current through the cell, and in Figs. 5 and 6 I have shown an embodiment of the invention in which the current through the cell may be read directly from a meter, and also in which the potentiometer 26 reads the correct potential actually applied to the cell. These embodiments thus avoid the necessity for balancing a potentiometer or the like in order to measure the current through the cell at any given impressed potential. Referring first to the embodiment shown in Fig. 5, this form of the invention likewise includes the cell of Fig. 1, the high potential means for releasing the drop, the cell circuit including the potentiometer 26 and resistance 33, the motor 46, cam 47 and associated switches as heretofore described. In this form of the invention the current to the cell also passes through a resistance 93 which is in series with the cell, the resistance 33 and the potentiometer 26. The resistance 93 is in the plate circuit of an amplifying tube indicated generally by the numeral 94, which tube may suitably be a 30 tube, together with a calibrating resistance 95 and a battery 96, which are in series therewith. The grid 97 of the tube is connected to the condenser 36 by way of a conductor 98. It will be observed that the potential of the grid 97 will thus depend upon the current through the resistance 33 at the instant of measurement. Since the current from the resistance 33 threads the resistance 93, there will tend to occur in the resistance 93 an IR drop of such sense that the point 99 is negative with respect to the point 101, this potential difference increasing in magnitude as the current increases. However, the resistance 93 also conducts the plate current of the tube 94, and this current also tends to maintain point 99 negative with respect to point 101. However, if the grid 97 of the tube 94 is made more negative by an increase in the current through the resistance 33, the plate current in the tube will fall and the IR drop in resistance 93 will tend to decrease due to a lesser plate current, and tend to increase due to increased current from the resistance 33, and the variable resistance 95 may be adjusted to secure the required increment. The net change in the IR drop across resistance 93 is thus made to compensate to some degree for that occurring in the resistance 33. A galvanometer 102 may be positioned in the plate circuit of the tube 94 to indicate the current through the resistance 33 since when so positioned it will be responsive to the IR drop over the resistance 33.

However, better correction for the IR drop in the resistance 33 may be had by using a two-stage amplifier as shown in Fig. 6, in which a second stage of amplification is employed having a further resistance 104 in series in the plate circuit thereof and also in series with the resistances 33 and 93. In this instance the grid 107 of the second amplifying tube 106 is connected through a suitable bias battery 100 to the plate 105 of the tube 94. When the current through the resistance 33 increases, the grid 97 of the tube 94 becomes more negative, the grid 107 of tube 106 becomes less negative, and more current flows through the plate circuit of the tube 106 and thus through the resistance 104. The polarity of the increment of IR drop in the resistance 104 occasioned by the plate current of tube 106 is in the opposite direction to the IR drop in this resistance occasioned by the current from the resistance 33. Thus these two currents are opposing each other, and hence when the current in the resistance 33 is increased, causing an increased IR drop therein and a tendency to increased IR drop in resistance 104, there occurs in resistance 104 a greatly amplified change of the current in the opposite directions; in other words, the plate current of tube 106. Thus, when the current in the resistance 33 increases, both tube circuits alter their respective plate currents in such manner as to apply compensating potentials to the cell circuit, and the circuit may be so designed that these compensating potentials exactly correct for the IR drop in the resistance 33. A galvanometer 108 is interposed in the plate circuit of the tube 106 to indicate the current flowing through the cell, and in this case the galvanometer 102 may be omitted. A bucking circuit, including an adjustable resistance 109 and a battery 111, is disposed around the galvanometer or meter 108 for the purpose of adjusting the meter to read zero with normal plate current, that is, a plate current when there is no IR drop in resistance 33. The calibrating resistance 95 serves to permit of calibrating the plate circuit of the tube to produce proper characteristics in the plate current with respect to the cell current.

Figure 7:
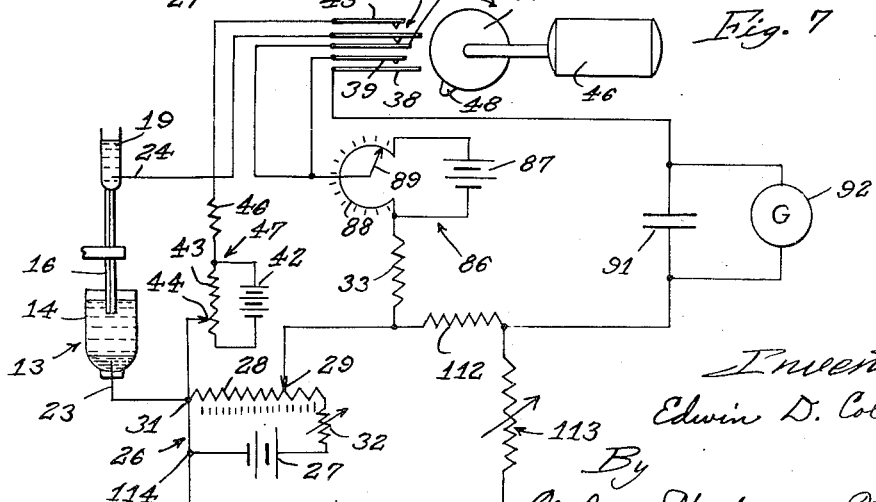
Fig. 7 is a still further embodiment of the invention showing means for compensating for the so-called condenser current effect in a dropping mercury or similar electrode.

It has been generally assumed, in prior art devices of this type, that the current flowing through the cell is wholly due to the deposition of the ionic species as described above, and this assumption has been made in the discussion of the embodiments heretofore described in this application. As a matter of fact, however, there also flows through the test cell an additional current increment called the condenser current which represents the energy required to electrically charge the constantly forming surface of the mercury drop. This current is proportional to the rate of surface formation of the drop and to the applied potential, and is considered to be zero at the electrode capillary maximum. While this condenser current may be neglected when measuring reasonably high concentrations in the test cell, it seriously limits the precision with which low concentrations may be determined. In the embodiment shown in Fig. 7, means are shown for effecting a compensation or correction for this condenser current in the cell circuit. This figure includes the cell and cell circuit shown in Fig. 1 including the potentiometer 26 and resistance 33, the high potential circuit for releasing the drop, the motor 46, cam 47 and associated switch blades as heretofore described. The entire arrangement is substantially that shown and described in Fig. 4 with the exception that a condenser current compensator circuit including a resistance 112 and adjustable resistance 113 are provided, the resistance 113 being connected to the potentiometer 26 as indicated at 114 in such manner that the resistances 112 and 113 are in series with the potentiometer. The resistance 112 is also in series in the circuit connecting the resistance 33 and the condenser 91. It will be observed that in the structure shown in Fig. 4 the potentiometer 86 introduces into the cell circuit a potential opposed to that of resistance 33, and the potentiometer is adjusted until the potential thus introduced exactly equals that of the resistance 33 at the selected instant of the drop life, this condition of balance being indicated by zero charge on the condenser 91 and a zero reading on the galvanometer 92. However, the condenser current flowing through the resistance 33 causes its IR drop to be greater than the ionic concentration in the cell warrants, the extent of the variation being substantially a linear function of the voltage applied to the cell at the selected instant in the drop life. In order to compensate for this variation, the resistances 112 and 113 are introduced, these resistances being connected to the same potentiometer 26 that feeds the cell. Hence the current through the resistances 112 and 113 is proportional to the potential applied to the cell by potentiometer 26, and hence proportional also to the condenser current, the factor for which correction is desired. Furthermore, it will be noted that the IR drop in resistance 112 is opposed to that in the resistance 33 in the condenser circuit, and that the potential for which potentiometer 86 is required to compensate, consists of the IR drop in resistance 33 minus the IR drop in resistance 112. By proper adjustment of the resistance 113, the IR drop in resistance 112 can be made equal and opposite to the increment of IR drop that is occasioned in resistance 33 by the condenser current, and thus correct for the condenser current variation as the voltage of potentiometer 26 is varied. It will be understood, of course, that the resistance 33 may be changed in magnitude to best suit the type of solution being examined, and that resistances 112 and 113 will be changed accordingly to maintain a proper condenser current correction.

The above desciption is believed to convey to those skilled in the art a complete and adequate disclosure of the invention sufficient to permit of the practice of the same, and is given by way of illustration and not limitation.

I claim:

1. The method of making tests upon a liquid with a dropping mercury electrode which includes the steps of starting the formation of a mercury droplet at a predetermined time by momentarily imparting a high potential to the previous droplet on said electrode to reduce the surface tension thereof and cause the same to release from the electrode, applying a substantially constant measurement potential to said drop, and effecting a measurement of the electrical current to the forming droplet resulting from said constant potential upon the lapse of a predetermined time after the start of formation of said drop and at a substantial interval after the constant potential is applied.

2. The method of making tests upon a liquid with a circuit having a dropping mercury electrode cell, a calibrated source of potential and a resistance in series, and having a measuring circuit, which includes the steps of measuring the voltage drop across said resistance at a predetermined phase in the life of a mercury drop on said electrode to measure the corresponding current through said cell, introducing into the circuit of said cell a voltage approximately equal to that lost in said resistance at said predetermined phase to cause said source of potential to indicate a close approximation of the true potential applied to said cell at said predetermined phase, and introducing into said measuring circuit a voltage equal and opposite to the voltage drop in said circuit produced by the condenser current through the cell to cause said measuring circuit to be responsive to the current through said cell.

3. The combination in a device of the character described of a test cell having a dropping mercury electrode, a circuit for selectively impressing on said cell any of a plurality of known substantially constant potentials, means for momentarily impressing a high potential on a drop previously disposed on said electrode to initiate the formation of a new droplet thereon, and means for measuring the flow of current to said droplet at a selected constant potential a predetermined time after said initiation and a substantial time in the life of said drop after said constant potential is applied thereto to determine the potential-current relationship of said cell.

4. The combination in a device of the character described of a non-polarizing electrode and a dropping mercury electrode disposed in a test sample, a circuit for impressing on said electrodes any of a plurality of potentials, means for initiating the formation of a mercury droplet on said electrode including a switch for momentarily impressing a high potential on a drop previously disposed on said electrode, means including a switch for measuring current flowing to said first mentioned droplet a predetermined time after said initiation, and means for actuating said switches in timed relation.

5. The combination in a device of the character described of a test cell, a circuit including a potentiometer for impressing on said cell any of a plurality of potentials, a resistance in said circuit, and potentiometric means for measuring the voltage drop across said resistance at any of said potentials to measure the current through said cell, said potentiometric means being coupled in said circuit for also introducing into said circuit a potential equal to the potential lost in said resistance at the time of measurement to cause said potentiometer to indicate the true potential applied to said cell.

6. The combination in a device of the character described of a test cell, a circuit for impressing on said cell any of a plurality of potentials, a resistance in said circuit, a condenser, means for periodically charging said condenser in accordance with the voltage drop across said resistance, and a potentiometer for measuring the charge on said condenser to measure the current through said cell, said potentiometer being disposed in the cell circuit to simultaneously introduce therein at the time of measurement a potential equal to the loss in said resistance.

7. The combination in a device of the character described of a test cell, a circuit for impressing on said cell any of a plurality of potentials, a resistance in said circuit, a condenser, means for periodically connecting said condenser in parallel with said resistance to charge said condenser in accordance with the voltage drop across said resistance, a potentiometer in series with said condenser, a galvanometer connected around said potentiometer and said condenser to indicate a condition of balance therebetween and thus measure the current through said cell, said potentiometer also being connected in said circuit in series with said resistance to also supply to said circuit at the time of balance a potential equal to the loss in said resistance.

8. The combination in a device of the character described of a test cell, a circuit for impressing on said cell any of a plurality of potentials, a resistance in said circuit across which the voltage drop is indicative of the current through said cell, a potentiometer in said circuit in series with said resistance for introducing in said circuit a voltage equal to that lost in said resistance, and means to indicate when said potentiometer has been brought into balance with said resistance.

9. The combination in a device of the character described of a test cell, a circuit for impressing on said cell any of a plurality of potentials to make a succession of measurements at different known potentials, a resistance in said circuit across which the voltage drop is indicative of the current through said cell, a potentiometer in said circuit in series with said resistance, a condenser, means for periodically connecting said condenser in parallel with said resistance and said potentiometer to charge said condenser in accordance with an imperfect balance between said potentiometer and said resistance, and a potential indicating device connected across said condenser for indicating the charge on said condenser whereby the reading on said potentiometer at the point of balance is a measure of the current through said cell.

10. The combination in a device of the character described of a test cell having a periodically reformed mercury electrode, a cell circuit for impressing on said cell any of a plurality of potentials, a resistance in said circuit across which the potential drop is indicative of the current through said cell, a second resistance in series with the first resistance, a condenser, means for connecting said condenser in parallel with said first resistance at a predetermined phase in the life of said electrode, to charge the same in accordance with the potential across said first resistance, and an amplifier circuit including an amplifying tube, a plate circuit connecting the cathode and the plate thereof, said plate circuit having a meter and said second resistance, and a grid connected to said condenser to produce a response in said plate circuit substantially proportional to the potential across said first resistance and thereby apply a corrective voltage to said cell circuit and to effect an indication on said meter proportional to the current through said cell at said phase in the life of said electrode.

11. The combination in a device of the character described of a test cell, a cell circuit for impressing on said cell any of a plurality of potentials, a resistance in said circuit across which the voltage drop is indicative of the current through said cell, a second resistance in series with the first resistance, a condenser, means for periodically connecting said condenser in parallel with said first resistance to charge the same in accordance with the potential across said first resistance at a particular instant, an amplifier circuit including an amplifying tube and a plate circuit having said second resistance, and a grid connected to said condenser to produce a response in the plate circuit proportional to the potential across said first resistance and thereby apply a corrective voltage to said cell circuit.

12. The combination in a device of the character described of a test cell, a cell circuit for impressing on said cell any of a plurality of potentials, a resistance in said circuit across which the voltage drop is indicative of the current through said cell, a second resistance in series with the first resistance, a condenser, means for periodically connecting said condenser in parallel with said first resistance to charge the same in accordance with the potential across said first resistance at a particular instant, and an amplifier circuit including an amplifying tube and a plate circuit having said second resistance, a grid connected to said condenser to produce a response in the plate circuit proportional to the potential across said first resistance and thereby apply a corrective voltage to said cell circuit and calibrating means for adjusting the amplifying tube circuit to give a desired proportionality between the current in the cell circuit and that in the amplifying circuit.

13. The combination in a device of the character described of a test cell, a cell circuit for impressing on said cell any of a plurality of potentials, a first resistance in said circuit across which the potential drop is indicative of the current through said cell, a second resistance in series with the first resistance, a third resistance in series with the first and second resistances, a condenser, means for periodically connecting said condenser in parallel with said first resistance to charge the same in accordance with the potential across said first resistance at a particular instant, an amplifier circuit including two amplifier tubes and plate circuits therefor each having one of said first and second resistances, a meter, and means connecting said condenser to the grid of the first tube, to produce a response in the plate circuit of the second tube proportional to the potential across said first resistance and thereby cause a corrective voltage to be applied to said cell circuit and to effect an indication in said meter proportional to the current through said cell at said particular instant.

14. The combination recited in claim 13 wherein said meter is positioned in the plate circuit of said second tube including a bucking circuit around said meter for adjusting the reading thereof.

15. The combination in a device of the character described of a circuit including voltage means, a first resistance and a test cell in series, a second circuit having said voltage means, a second resistance and a third resistance in series, a third circuit having said first and second resistances, a condenser and a periodic circuit closer in series.

16. The combination in a device of the character described of a test cell having a dropping mercury electrode, a cell circuit including said electrode and a resistance, voltage means in said circuit for introducing into said circuit any of a plurality of potentials, means for measuring the potential across said resistance to measure the current through said cell, and a corrective circuit responsive to the potential of said voltage means to alter the response of said measuring means in proportion to said potential to compensate for the condenser current of the growing drop.

17. The combination in a device of the character described of a test cell having a dropping mercury electrode, a cell circuit including said electrode, voltage means in said circuit for introducing into said circuit any of a plurality of potentials, means for measuring the current through said cell at a selected phase in the drop cycle, and a corrective circuit responsive to the potential of said voltage means to alter the response of said measuring means in proportion to said potential to compensate for the changing electrostatic capacity of the growing drop.

18. The method of making tests upon a liquid with a circuit having a dropping mercury electrode cell, a calibrated source of potential and a resistance in series, and having a measuring circuit, which includes the steps of measuring the voltage drop across said resistance to measure the corresponding current through said cell, introducing into the circuit of said cell a voltage equal to that lost in said resistance at the time of measurement to cause said source of potential to indicate the true potential applied to said cell at the time of measurement, and introducing into said measuring circuit a voltage equal and opposite to the voltage drop in said circuit produced by the condenser current through the cell to cause said measuring circuit to be responsive to the current through said cell.

19. The combination in a device of the character described of a test cell having a dropping mercury electrode, a circuit for impressing on said cell any of a plurality of known constant potentials, a resistance in said circuit, a condenser, means for periodically connecting said condenser in parallel with said resistance at a predetermined phase in the life of each drop to charge said condenser in accordance with the voltage drop across said resistance, a potentiometer in series with said condenser, and a galvanometer connected around said potentiometer and said condenser to indicate a condition of balance therebetween and thus measure the current through said cell.

20. The combination in a device of the character described of a test cell having a dropping mercury electrode, a cell circuit including said electrode and a resistance, voltage means in said circuit for introducing into said circuit any of a plurality of potentials, means including a circuit for measuring the potential across said resistance to measure the current through said cell, and means for introducing into the circuit of said measuring means a potential equal and opposite to the potential drop across said resistance due to the condenser current to compensate for the condenser current of the growing drop.

21. The combination in a device of the character described of a test cell having a dropping mercury electrode, a circuit for selectively impressing on said cell any of a plurality of known substantially constant potentials, circuit means for momentarily impressing a high potential on a drop previously disposed on said electrode to initiate the formation of a new droplet thereon, circuit means including a galvanometer for measuring the flow of current to said droplet at a selected constant potential a predetermined time after said initiation, and means for opening and closing said circuit means successively in timed relation at a frequency sufficient to maintain a substantially continuous indication on said galvanometer to determine the potential current relationship of said cell.

22. The combination in a device of the character described of a test cell having a dropping mercury electrode, a circuit for selectively impressing on said cell any of a plurality of known substantially constant potentials, circuit means for momentarily impressing a high potential on a drop previously disposed on said electrode to initiate the formation of a new droplet thereon, circuit means including a galvanometer for measuring the flow of current to said droplet at a selected constant potential a predetermined time after said initiation, means for opening and closing said circuit means successively in timed relation at a frequency sufficient to maintain a substantially continuous indication on said galvanometer to determine the potential current relationship of said cell, and means for altering said first mentioned circuit to impress preselected potentials on said cell.

23. The combination in a device of the character described of a test cell, a circuit for impressing on said cell any of a plurality of potentials, a fixed resistance and a potentiometer in series therewith in said circuit, and means for detecting a potential difference across said series comprising said fixed resistance and said potentiometer.

EDWIN D. COLEMAN.